(12) United States Patent
Wilson

(10) Patent No.: US 8,659,556 B2
(45) Date of Patent: Feb. 25, 2014

(54) ADVANCED RECEIVE CHANNEL ARCHITECTURE

(75) Inventor: Thomas James Wilson, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 1216 days.

(21) Appl. No.: 12/208,303

(22) Filed: Sep. 10, 2008

(65) Prior Publication Data

US 2010/0060589 A1    Mar. 11, 2010

(51) Int. Cl.
*G09G 5/00* (2006.01)

(52) U.S. Cl.
USPC .......................... 345/173; 178/18.01; 345/174

(58) Field of Classification Search
USPC .................... 345/173–178; 178/18.01–18.11
See application file for complete search history.

(56) References Cited

U.S. PATENT DOCUMENTS

| | | | |
|---|---|---|---|
| 4,015,262 A * | 3/1977 | Etcheverry et al. | ........... 342/396 |
| 5,483,261 A | 1/1996 | Yasutake | |
| 5,488,204 A | 1/1996 | Mead et al. | |
| 5,766,493 A | 6/1998 | Shin | |
| 5,816,225 A | 10/1998 | Koch et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,229,856 B1 * | 5/2001 | Diab et al. | ........... 375/316 |
| 6,310,610 B1 | 10/2001 | Beaton et al. | |
| 6,323,846 B1 | 11/2001 | Westerman et al. | |
| 6,327,011 B2 | 12/2001 | Kim | |
| 6,330,578 B1 | 12/2001 | Savin et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 2002/0067845 A1 * | 6/2002 | Griffis | ........... 382/107 |
| 2006/0026521 A1 | 2/2006 | Hotelling et al. | |
| 2006/0097991 A1 | 5/2006 | Hotelling et al. | |
| 2006/0197753 A1 | 9/2006 | Hotelling | |

(Continued)

FOREIGN PATENT DOCUMENTS

| | | |
|---|---|---|
| AU | 2008100548 A4 | 8/2008 |
| JP | 2000-163031 A | 6/2000 |
| JP | 2002-342033 A | 11/2002 |
| WO | WO-2010/030708 A1 | 3/2010 |

OTHER PUBLICATIONS

International Search Report mailed Jan. 21, 2010, for PCT Patent Application No. PCT/US2009/056412, filed Sep. 9, 2009, three pages.

(Continued)

*Primary Examiner* — Regina Liang
(74) *Attorney, Agent, or Firm* — Morrison & Foerster LLP

(57) ABSTRACT

This relates to an architecture of a receive channel circuit used during both a spectrum analysis phase and a touch panel detection phase. Various components of the receive channel can be used during both the spectrum analysis phase and the touch panel detection phase. For example, a plurality of digital signal mixers used in the receive channel circuit can be used to demodulate signals during both a spectrum analysis phase and a touch sensor panel detection phase. In addition, the number of digital mixers needed in the receive channel can be reduced by dividing groups of signals to be demodulated into multiple sets of signals and demodulating each set at different times.

24 Claims, 7 Drawing Sheets

(56) References Cited

U.S. PATENT DOCUMENTS

| | | | |
|---|---|---|---|
| 2006/0284856 A1* | 12/2006 | Soss | 345/173 |
| 2008/0157893 A1* | 7/2008 | Krah | 331/177 R |
| 2008/0158167 A1 | 7/2008 | Hotelling et al. | |
| 2008/0252500 A1* | 10/2008 | Strandjord et al. | 341/143 |
| 2008/0309628 A1* | 12/2008 | Krah et al. | 345/173 |
| 2010/0059295 A1* | 3/2010 | Hotelling et al. | 178/18.06 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

ADVANCED RECEIVE CHANNEL ARCHITECTURE

FIELD OF THE INVENTION

This relates to touch sensor panels used as input devices for computing systems, and more particularly, to demodulating signals received from a touch sensor panel.

BACKGROUND OF THE INVENTION

Many types of input devices are presently available for performing operations in a computing system, such as buttons or keys, mice, trackballs, touch sensor panels, joysticks, touch screens and the like. Touch screens, in particular, are becoming increasingly popular because of their ease and versatility of operation as well as their declining price. Touch screens can include a touch sensor panel, which can be a clear panel with a touch-sensitive surface, and a display device that can be positioned behind the panel so that the touch-sensitive surface can substantially cover the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Touch sensor panels can be formed from a matrix of drive and sense lines, with sensors or pixels present where the drive and sense lines cross over each other while being separated by a dielectric material in multi-layer embodiments, or where the drive and sense lines are adjacent to each other in single-sided embodiments. Each drive line can be driven by a stimulation signal, and touch locations can be identified because the charge injected into the sense lines due to the stimulation signal is proportional to the amount of touch. However, the high voltage that can be required for the stimulation signal can force the sensor panel circuitry to be larger in size, and separated into two or more discrete chips. In addition, touch screens formed from capacitance-based touch sensor panels and display devices such as liquid crystal displays (LCDs) can suffer from noise problems because the voltage switching required to operate an LCD can capacitively couple onto the sense lines of the touch sensor panel and cause inaccurate measurements of touch. Furthermore, alternating current (AC) adapters used to power or charge the system can also couple noise into the touchscreen. Other sources of noise can include switching power supplies in the system, backlight inverters, and light emitting diode (LED) pulse drivers. Each of these noise sources has a unique frequency and amplitude of interference that can change with respect to time. Accounting for noise problems can require additional logic circuitry, which can use up more die space and power.

SUMMARY OF THE INVENTION

Various embodiments of the present invention can use particular components of a receive channel circuit during both a spectrum analysis phase and a touch panel detection phase of a touch sensor panel. A spectrum analysis phase can include analyzing noise to identify low noise stimulation frequencies. A touch panel detection phase can include using one or more stimulation frequencies and phases to detect and localize touch events on the touch sensor panel.

When performing a spectrum analysis, no stimulation signal is applied to any of the drive lines in the touch sensor panel. The sum of the output of all receive channels, which can represent the total charge being applied to the touch sensor panel including all detected noise, can be demodulated using in-phase (I) and quadrature (Q) signals of one or more frequencies. The demodulated outputs can be used to calculate the magnitude of the noise at that particular frequency, wherein the lower the magnitude, the lower the noise at that frequency. One or more low noise frequencies can be selected for use in a subsequent touch sensor panel scan.

When performing the touch sensor panel scan function, one or more selected low noise frequencies can be used to simultaneously stimulate the drive lines of the touch sensor panel, and signals received from the sense lines connected to the receive channels can be demodulated using the selected low noise frequencies. The demodulated signals can then be saved. After all steps have been completed, the saved results can be used in calculations to determine an image of touch for the touch sensor panel at each frequency.

The number of digital signal mixers used in the receive channel circuit can be reduced by using the same digital signal mixers to perform functions during both a spectrum analysis phase and a touch panel detection phase. For example, the same digital mixers can be used to demodulate signals during both a spectrum analysis phase and a touch sensor panel detection phase. Moreover, groups of signals being demodulated using the signal mixers can be divided into multiple sets of signals and each set can be demodulated at different times. Doing so can further reduce the number of mixers needed to perform the demodulation functions. As an example, if the signals to be demodulated are divided into two sets, then the number of signal mixers need to demodulate the signals can be reduced by half.

Furthermore, the size of a sine look-up table (LUT) for a numerically controlled oscillator can be reduced by taking advantage of the symmetry of the sine waveform. For example, a quarter of a sine waveform can be saved in the LUT and the remaining quadrants of the waveform can be derived based on the symmetry of the sine wave.

DETAILED DESCRIPTION OF THE PREFERRED EMBODIMENT

Figure 1:
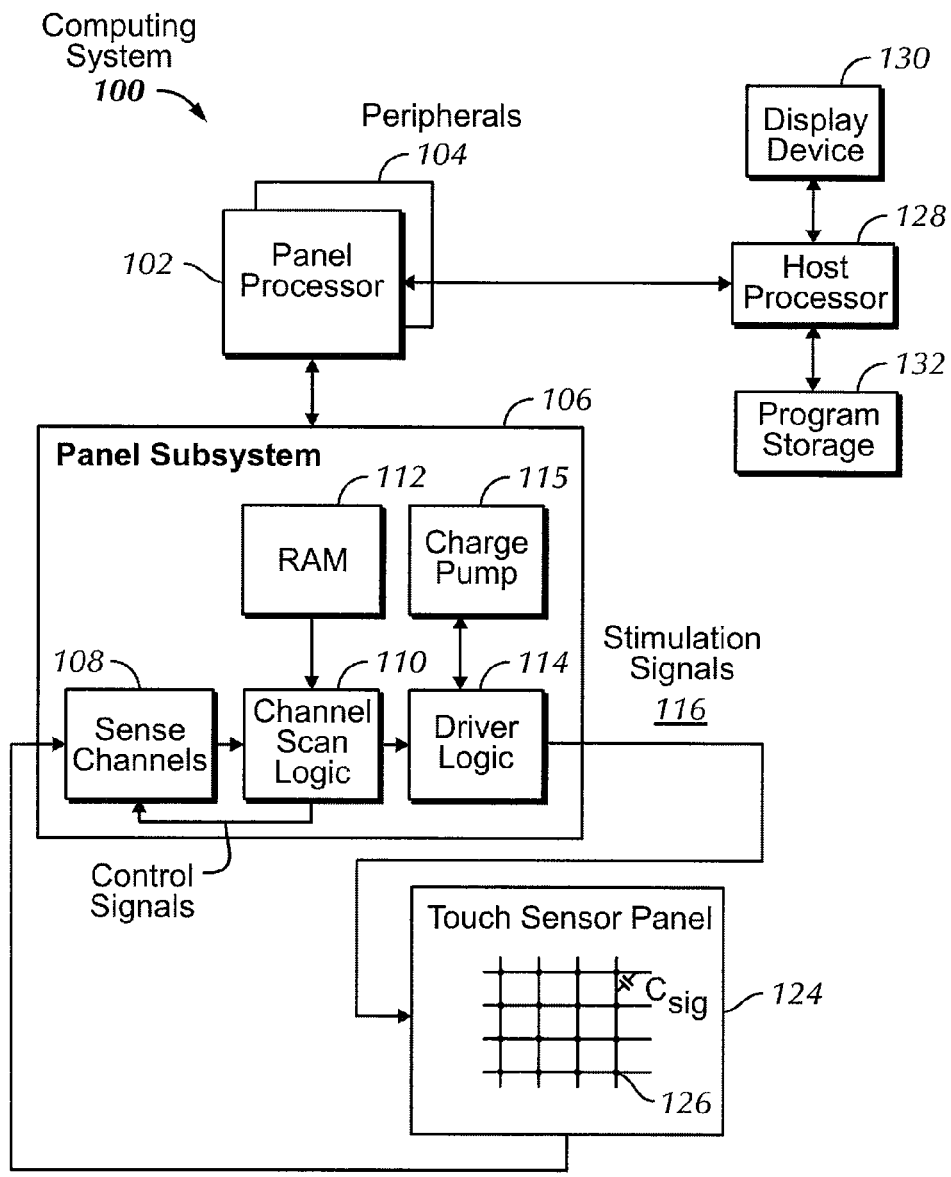
FIG. 1 illustrates an exemplary computing system that can utilize multiple digital mixers to perform spectrum analysis of noise and identify low noise stimulation frequencies, and can utilize multiple stimulation frequencies and phases to detect and localize touch events on a touch sensor panel according to various embodiments of this invention.

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to the use of particular components of a receive channel circuit during both a spectrum analysis phase and a touch panel detection phase. A spectrum analysis phase can include analyzing noise to identify low noise stimulation frequencies. A touch panel detection phase can include using one or more stimulation frequencies and phases to detect and localize touch events on a touch sensor panel.

When performing a spectrum analysis, no stimulation signal is applied to any of the drive lines in the touch sensor panel. The sum of the output of all receive channels, which can represent the total charge being applied to the touch sensor panel including all detected noise, can be demodulated using in-phase (I) and quadrature (Q) signals of one or more frequencies. The demodulated outputs can be used to calculate the magnitude of the noise at that particular frequency, wherein the lower the magnitude, the lower the noise at that frequency. One or more low noise frequencies can be selected for use in a subsequent touch sensor panel scan.

When performing the touch sensor panel scan function, one or more selected low noise frequencies can be used to simultaneously stimulate the drive lines of the touch sensor panel, and signals received from the sense lines connected to the receive channels can be demodulated using the selected low noise frequencies. The demodulated signals can then be saved. After all steps have been completed, the saved results can be used in calculations to determine an image of touch for the touch sensor panel at each frequency.

In accordance with various embodiments, the number of digital signal mixers used in the receive channel circuit can be reduced by using the same digital signal mixers to perform functions during both a spectrum analysis phase and a touch panel detection phase. For example, the same digital mixers can be used to demodulate signals during both a spectrum analysis phase and a touch sensor panel detection phase. Moreover, groups of signals being demodulated using the signal mixers can be divided into multiple sets of signals and each set can be demodulated at different times. Doing so can further reduce the number of mixers needed to perform the demodulation functions. As an example, if the signals to be demodulated are divided into two sets, then the number of signal mixers need to demodulate the signals can be reduced by half.

Furthermore, in accordance with various embodiments, the size of a sine look-up table (LUT) for a numerically controlled oscillator can be reduced by taking advantage of the symmetry of the sine waveform. For example, a quarter of a sine waveform can be saved in the LUT and the remaining quadrants of the waveform can be derived based on the symmetry of the sine wave.

Although some embodiments of this invention may be described herein in terms of mutual capacitance touch sensors, it should be understood that embodiments of this invention are not so limited, but are generally applicable to other types of touch sensors such as self capacitance touch sensors. Furthermore, although the touch sensors in the touch sensor panel may be described herein in terms of an orthogonal array of drive lines and sense lines, it should be understood that embodiments of this invention are not limited to orthogonal arrays, but can be generally applicable to touch sensors arranged in any number of dimensions and orientations, including diagonal, concentric circle, and three-dimensional and random orientations. In addition, the touch sensor panel described herein can be either a single-touch or a multi-touch sensor panel, the latter of which is described in Applicant's co-pending U.S. application Ser. No. 10/842,862 entitled "Multipoint Touchscreen," filed on May 6, 2004 and published as U.S. Published Application No. 2006/0097991 on May 11, 2006, the contents of which are incorporated by reference herein in their entirety for all purposes.

FIG. 1 illustrates exemplary computing system 100 that can perform spectrum analysis of noise and identify low noise stimulation frequencies, and can utilize multiple stimulation frequencies and phases to detect and localize touch events on a touch sensor panel according to embodiments of the invention. Computing system 100 can include one or more panel processors 102 and peripherals 104, and panel subsystem 106. One or more panel processors 102 can include, for example, ARM968 processors or other processors with similar functionality and capabilities. However, in other embodiments, the panel processor functionality can be implemented instead by dedicated logic, such as a state machine. Peripherals 104 can include, but are not limited to, random access memory (RAM) or other types of memory or storage, watchdog timers and the like. Panel subsystem 106 can include, but is not limited to, one or more receive channels 108, channel scan logic 110 and driver logic 114. Channel scan logic 110 can access RAM 112, autonomously read data from the receive channels and provide control for the receive channels. In addition, channel scan logic 110 can control driver logic 114 to generate stimulation signals 116 at various frequencies and phases that can be selectively applied to drive lines of touch sensor panel 124. In some embodiments, panel subsystem 106, panel processor 102 and peripherals 104 can be integrated into a single application specific integrated circuit (ASIC).

Touch sensor panel 124 can include a capacitive sensing medium having a plurality of row traces or driving lines and a plurality of column traces or sensing lines, although other sensing media can also be used. The drive and sense traces can be formed from a transparent conductive medium such as Indium Tin Oxide (ITO) or Antimony Tin Oxide (ATO), although other transparent and non-transparent materials such as copper can also be used. In some embodiments, the drive lines and sense lines can be perpendicular to each other, although in other embodiments other non-Cartesian orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). The drive lines and sense lines can be formed on a single side of a substantially transparent substrate separated by a substantially transparent dielectric material, on opposite sides of the substrate, or on two separate substrates separated by the dielectric material.

In some two-layer touch sensor panel embodiments, at the "intersections" of the traces, where the traces pass above and below (cross) each other (but do not make direct electrical contact with each other), the traces can essentially form two electrodes (although more than two traces could intersect as well). Each intersection of row trace and column trace can represent a capacitive sensing node and can be viewed as picture element (pixel) 126, which can be particularly useful when touch sensor panel 124 is viewed as capturing an "image" of touch. (In other words, after panel subsystem 106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between row and column electrodes appears as a stray capacitance when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which is a function of Csig. Each column of touch sensor panel 124 can drive receive channel 108 (also referred to herein as an event detection and demodulation circuit) in panel subsystem 106.

Computing system 100 can also include host processor 128 for receiving outputs from panel processor 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as an LCD display for providing a UI to a user of the device.

In some systems, sensor panel 124 can be driven by high-voltage driver logic. The high voltages that can be required by the high-voltage driver logic (e.g. 18V) can force the high-voltage driver logic to be formed separate from panel subsystem 106, which can operate at much lower digital logic voltage levels (e.g. 1.7 to 3.3V). However, in embodiments of the invention, on-chip driver logic 114 can replace the off-chip high voltage driver logic. Although panel subsystem 106 can have low, digital logic level supply voltages, on-chip driver logic 114 can generate a supply voltage greater that the digital logic level supply voltages by cascoding two transistors together to form charge pump 115. Charge pump 115 can be used to generate stimulation signals 116 (Vstim) that can have amplitudes of about twice the digital logic level supply voltages (e.g. 3.4 to 6.6V). Although FIG. 1 shows charge pump 115 separate from driver logic 114, the charge pump can be part of the driver logic.

Figure 2A:
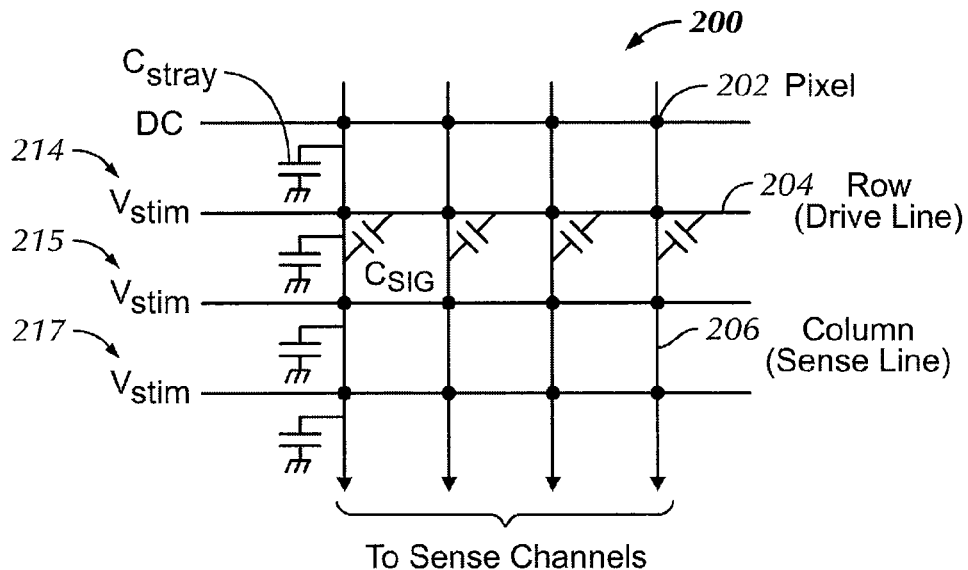
FIG. 2a illustrates an exemplary mutual capacitance touch sensor panel according to various embodiments of this invention.

FIG. 2a illustrates exemplary mutual capacitance touch sensor panel 200 according to embodiments of the invention. FIG. 2a indicates the presence of a stray capacitance Cstray at each pixel 202 located at the intersection of a row 204 and a column 206 trace (although Cstray for only one column is illustrated in FIG. 2a for purposes of simplifying the figure). In the example of FIG. 2a, AC stimuli Vstim 214, Vstim 215 and Vstim 217 can be applied to several rows, while other rows can be connected to DC. Vstim 214, Vstim 215 and Vstim 217 can be at different frequencies and phases, as will be explained later. Each stimulation signal on a row can cause a charge Qsig=Csig×Vstim to be injected into the columns through the mutual capacitance present at the affected pixels. A change in the injected charge (Qsig_sense) can be detected when a finger, palm or other object is present at one or more of the affected pixels. Vstim signals 214, 215 and 217 can include one or more bursts of sine waves. Note that although FIG. 2a illustrates rows 204 and columns 206 as being substantially perpendicular, they need not be so aligned, as described above. As described above, each column 206 can be connected to a receive channel (see receive channels 108 in FIG. 1).

Figure 2B:
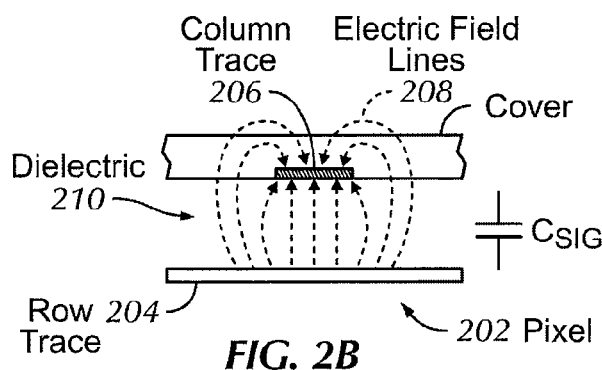
FIG. 2b is a side view of an exemplary pixel in a steady-state (no-touch) condition according to various embodiments of this invention.

FIG. 2b is a side view of exemplary pixel 202 in a steady-state (no-touch) condition according to embodiments of the invention. In FIG. 2b, an electric field of electric field lines 208 of the mutual capacitance between column 206 and row 204 traces or electrodes separated by dielectric 210 is shown.

Figure 2C:
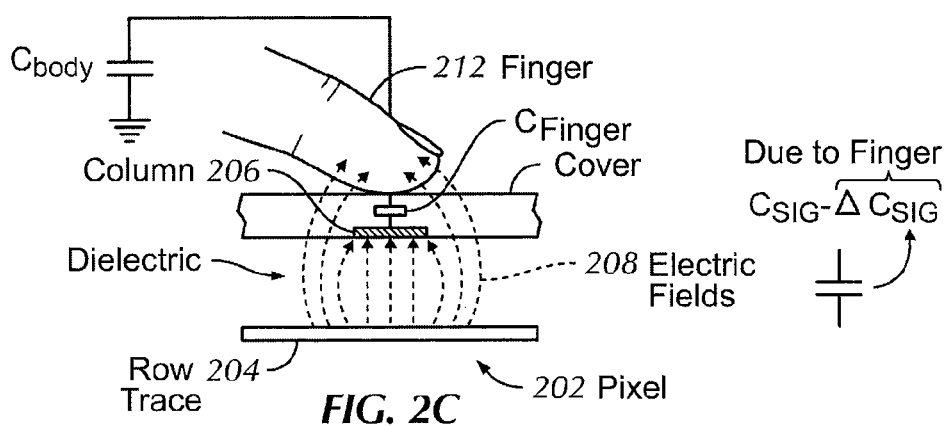
FIG. 2c is a side view of an exemplary pixel in a dynamic (touch) condition according to various embodiments of this invention.

FIG. 2c is a side view of exemplary pixel 202 in a dynamic (touch) condition. In FIG. 2c, finger 212 has been placed near pixel 202. Finger 212 is a low-impedance object at signal frequencies, and has an AC capacitance Cfinger from the column trace 204 to the body. The body has a self-capacitance to ground Cbody of about 200 pF, where Cbody is much larger than Cfinger. If finger 212 blocks some electric field lines 208 between the row and column electrodes (those fringing fields that exit the dielectric and pass through the air above the row electrode), those electric field lines are shunted to ground through the capacitance path inherent in the finger and the body, and as a result, the steady state signal capacitance Csig is reduced by ΔCsig. In other words, the combined body and finger capacitance act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig−ΔCsig, where Csig represents the static (no touch) component and ΔCsig represents the dynamic (touch) component. Note that Csig−ΔCsig may always be nonzero due to the inability of a finger, palm or other object to block all electric fields, especially those electric fields that remain entirely within the dielectric material. In addition, it should be understood that as a finger is pushed harder or more completely onto the multi-touch panel, the finger can tend to flatten, blocking more and more of the electric fields, and thus ΔCsig can be variable and representative of how completely the finger is pushing down on the panel (i.e. a range from "no-touch" to "full-touch").

Figure 3:
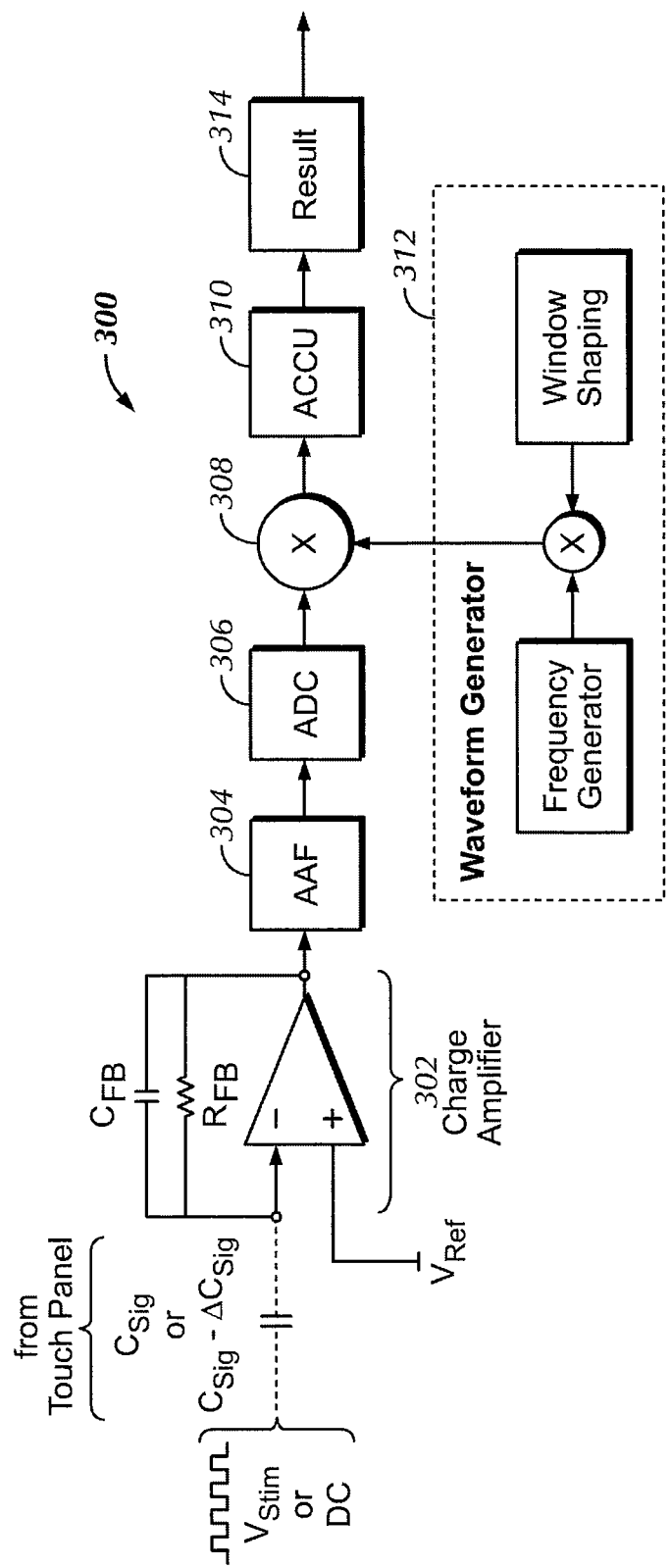
FIG. 3 illustrates an exemplary receive channel or event detection and demodulation circuit according to various embodiments of this invention.

FIG. 3 illustrates exemplary receive channel 300 (also known as sense channel or analog channel) in accordance with various embodiments. One or more receive channels 300 can be present in a multi-touch subsystem, such as multi-touch subsystem 106. Referring again to FIG. 3, one or more sense lines 206 (FIG. 2a) of a multi-touch panel can be coupable to each receive channel 300. Each receive channel 300 can include charge amplifier 302, anti-aliasing filter 304 and analog-to-digital converter (ADC) 306, digital mixer 308 (e.g., multiplier circuit) and accumulator 310. Digital mixer 308 can be driven by NCO (Numerically Controlled Oscillator) 312 that may include amplitude window shaping using a window function. Receive channel 300 can be driven by an input signal (e.g., Vstim or a DC signal), resulting in a steady state signal capacitance Csig when no finger, palm or object is present or a dynamic signal capacitance Csig−ΔCsig when a finger, palm or other object is present. With further reference to FIG. 3, receive channel 300 can receive a signal representative of the capacitance or change in capacitance (Csig or Csig−ΔCsig) from a touch panel and convert it into the digital domain, demodulate the digital signal with a demodulation waveform and accumulate the output in accumulator 310. The accumulated output can then be stored in result register 314 and provided for further processing. In accordance with some embodiments, receive channel 300 can be implemented as part of an ASIC.

Figure 4A:
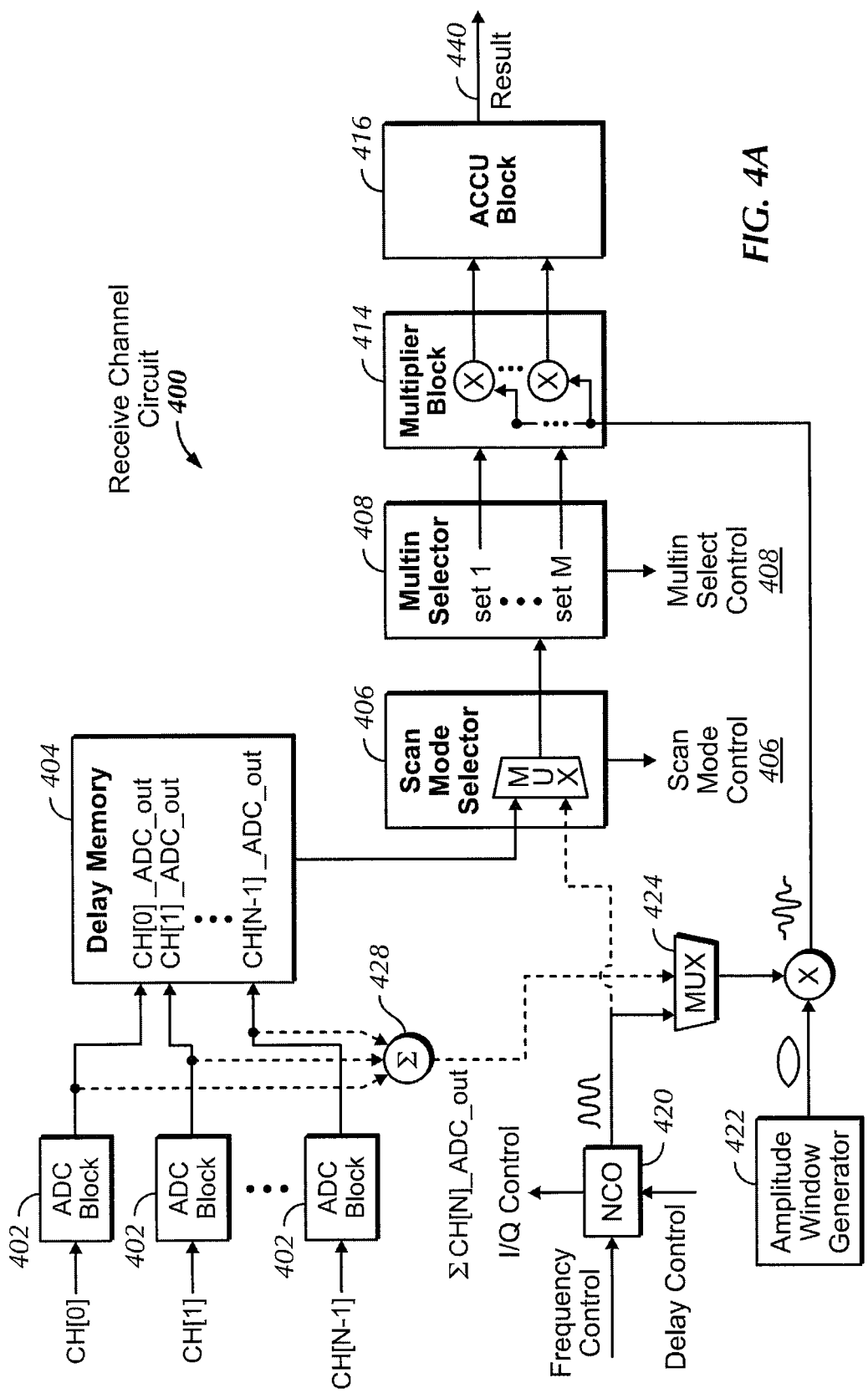
FIG. 4a illustrates a simplified block diagram of an exemplary N channel receive circuit (also referred to as "receive channel circuit") according to various embodiments of this invention.

FIG. 4a illustrates a block diagram of exemplary N channel receive channel circuit 400 (also referred to herein as "receive channel circuit") that can be configured both as a spectrum analyzer and as touch panel scan logic according to various embodiments. Receive channel circuit 400 can be present in the panel subsystem 106 (FIG. 1). In contrast to receive channel 300 of FIG. 3, which can receive signals from one channel at a time, receive channel circuit 400 can receive signals from a plurality of channels simultaneously or nearly simultaneously. Moreover, receive channel circuit 400 can use many of the same components to perform both spectrum analysis functions and touch sensor panel detection functions. Doing so can reduce the die space needed to demodulate channels in different operating modes. Moreover, channels can be multiplexed, thereby using fewer mixers to demodulate multiple channels. Note that the solid-line connections in FIG. 4a can represent receive channel circuit 400 configured as touch sensor panel detection logic, and the dashed-line connections can represent receive channel circuit 400 configured as spectrum analyzer logic. FIG. 4a will be discussed in greater detail hereinafter.

Receive channel circuit 400 will now be described when configured as touch panel detection logic. In the example illustrated in FIG. 4a, receive channel circuit 400 can demodulate N channels (each channel is referenced as CH[0], Ch[1] . . . CH[N-1] in FIG. 4a). In one example, the number of channels, N, can be ten, but it is understood that the number of channels can be varied and is not limited to any particular number. Although the present disclosure typically describes receive channel circuit 400 coupled to a plurality of channels, in accordance with various embodiments, the number of channels, N, can be equal to one.

With further reference to FIG. 4a, each channel can be coupled to a separate sense line of a touch sensor panel. Analog-to-digital (ADC) blocks 402 of receive channel circuit 400 can be coupled to respective channels to receive raw signals from the sense lines of the touch sensor panel and covert the signals into digital signals (also referred to herein as "digital samples"). In accordance with various embodiments, ADC block 402 can include an amplifier, such as a charge amplifier or programmable gain amplifier (PGA), an anti-aliasing filter and an ADC.

Delay Memory block 404 can receive and store the digital samples outputted from ADC blocks 402 coming from all channels at the same time. FIG. 4a references the digital samples outputted from ADC blocks as CH[0]_ADC_out, CH[1]_ADC_out . . . CH[N-1]_ADC_out. Accordingly, if there is a total of ten channels being fed into receive channel circuit 400, then Delay Memory block 404 can store digital samples values from all ten channels.

From Delay Memory block 404, the digital samples can be fed into Scan Mode Selector block 406. Scan Mode Selector block 406 can be configured to switch between a spectrum analysis phase and a touch sensor panel detection phase, wherein Scan Selector block 406 outputs the digital samples (CH[0]_ADC_out, CH[1]_ADC_out . . . CH[N-1]_ADC_out) to Multin Selector block 408 during the touch sensor panel detection phase. Scan Mode Selector block 406 can include a scan_mode input to switch the Scan Mode Selector block 406 between touch panel detection phase and spectrum analysis phase. In accordance with various embodiments, the Scan Mode Selector block 406 can include a multiplexer or switch for example, operable to pass either the digital samples or the digital sample frequencies depending upon its present scan mode (i.e., spectrum analysis mode or touch panel detection mode).

Multin Selector block 408 can multiplex a plurality of sets of digital samples. In accordance with various embodiments, the Multin Selector block 408 can select a first half of digital samples (e.g., five of ten digital samples) to be sent to Multiplier block 414 at a first time and a second half of the digital samples (e.g., the remaining five of ten digital samples) to be sent to Multiplier block 414 at a second time. However, it is understood that the digital samples can be divided into more than two sets in other embodiments.

Multin Selector block 408 can include a multiplexer and a multin_selector input for controlling which set of digital samples are sent to Multiplier block 414. The multin_selector input can receive control signal 412, which can be a clock signal in accordance with various embodiments. In embodiments using such a clock signal, a first set of digital samples can be sent to Multiplier block 414 on a first edge of a clock cycle and a second set of digital samples can be sent to Multiplier block 414 at a second clock cycle edge. Accordingly, in the example of the digital samples being divided into two sets, all of the digital samples can be sent to multiplier block 414 during one clock cycle. In accordance with various embodiments, the clock cycle can have a frequency of 4 megahertz (MHz).

As discussed above, a plurality of sets of digital samples can be sent from Multin Selector block 412 to Multiplier block 414 at different times. Multiplier block 414 can then mix each digital sample with a windowed demodulation waveform using a signal multiplier, for example. The demodulated output from each signal multiplier can then be stored in accumulator 416.

In accordance with various embodiments, the number of multipliers used in multiplier block 410 can be equal to the number of digital samples in each set of digital samples sent by Multi Selector block 414. Thus, five multipliers can be used in an example of Multin Selector 408 dividing a total of ten digital samples into two sets of five digital samples. In this manner, instead of needing a multiplier for each digital sample received from all of the channels connected to circuit 400, fewer multipliers can be used, since the number of digital samples sent to Multiplier block 414 at a particular time can be reduced by multiplexing using Multin Selector block 408.

As discussed above, during a touch panel detection phase, each digital sample can be demodulated by mixing the digital sample with a demodulation wave form. With further reference to FIG. 4*a*, numerically controlled oscillator (NCO) 420 can digitally generate a demodulation waveform synchronized to the input stimulation signal applied to the drive lines of the touch sensor panel. In accordance with various embodiments, the demodulation waveform can be a sine wave. In addition, NCO 420 can include a numerical control input to set an output frequency, a control input to set a delay, and a control input to enable NCO 420 to generate an in-phase (I) or quadrature (Q) signal or both. In accordance with various embodiments, NCO 420 can generate both an in-phase and quadrature signal simultaneously time.

The digital demodulation waveform generated by NCO 420 can then be mixed with a window function generated by Amplitude Window Generator 422 using mixer 426, resulting in a windowed digital representation of a demodulation waveform. In accordance with various embodiments, the Amplitude Window Generator 422 can include an amplitude lookup table (AmpLUT) that outputs windowed digital amplitude values over time. The output of mixer 426 can then be applied to each mixer used in multiplier block 414 so as to mix the windowed digital representation of the demodulated waveform with the digital samples in each set of digital samples.

Receive channel circuitry 400 will now be described when configured as spectrum analysis logic. When receive channel circuit 400 is configured a touch panel detection logic, receive channel circuit 400 can receive digital samples from each channel connected to respective ADC blocks 402. However, when configured for spectrum analysis phase, all output from ADC blocks 402 can be summed together using summing circuit 428, such as an adder circuit, into, effectively, a single digital sample representing the sum of all of the digital samples (hereinafter also referred to as "the summation of the digital samples") received from the channels. FIG. 4*a* references a signal representative of summation of the digital samples as $\Sigma CH[N]\_ADC\_out$.

The output of the summation circuit 428 can then pass through multiplexer 424 and then be mixed with a windowing function (supplied by Amplitude window block 422) using mixer 426. The output from mixer 426 (i.e. a windowed summation of the digital samples) can then be fed into Multiplier block 414.

During spectrum analysis, the windowed summation of the digital samples can then be separately mixed with a plurality of sample frequencies. The sample frequencies can be generated by NCO 420, fed through Scan Mode Selector block 406 and into Multin Selector block 408. Similar to how the digital samples can be applied to Multiplier block 414 during touch panel detection phase, as described above, Multin Selector block 408 can divide the sample frequencies into two sets, and apply a first set of the sample frequencies to Multiplier block 414 at a first time and a second set of the plurality of sample frequencies at a second time. The windowed summation of the digital samples (outputted from mixer 426) can then be demodulated with each of the sample frequencies using mixers in Multiplier block 414.

In accordance with various embodiments, the timing used to apply each set of sample frequencies to the Multiplier block 414 can be the same as is used during touch panel detecting phase; for example at each clock edge of a control signal. Moreover, the number of sample frequencies can be the same as the number of digital samples received from the channels of the touch sensor panel. Accordingly, in the example of using ten channels, ten different sample frequencies can be used. Similar to the mixing of the digital samples during touch panel scanning, the ten sample frequencies can be divided into two sets and separately mixed with the windowed summation of the digital samples. In this manner, all of the multipliers used during touch panel scanning can also be used during spectrum analysis. In accordance with various embodiments, the ten digital sample frequencies can include five in-phase (I) signals and five quadrature (Q) signals.

Accumulator 416 can then accumulate the output from Multiplier block 414. The accumulated output can then be transmitted as result 440 for processing to identify low noise frequencies to be used during a touch panel detection phase.

Figure 4B:
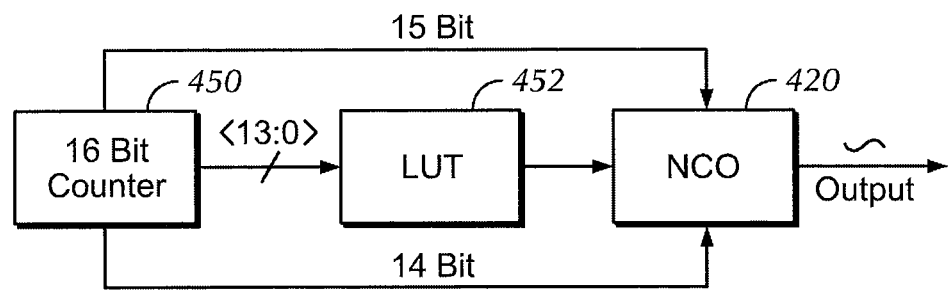
FIG. 4b illustrates a sine look-up table (LUT) used to provide a digital values for an NCO to construct a sine waveforms in accordance with various embodiments of this invention.

FIG. 4*b* illustrates a sine look-up table (LUT) used to provide a digital values for NCO 420 to construct a sine waveforms in accordance with various embodiments. The configuration of using sine LUT 452 with NCO 420 of FIG. 4*a* can be used in receive channel circuit 400 to generate sine waveforms. As illustrated, 16-bit counter 450 can provide 14 bit values used as an address look-up into sine LUT 452. Each entry in the sine LUT 452 can be a binary representation of an angle of a sine waveform that is represented by the 14 bit value. In accordance with various embodiments, the size of a sine LUT 452 can be reduced by taking advantage of the symmetry of the sine waveform. For example, a quarter of a sine waveform can be saved in the LUT and the remaining quadrants of the waveform can be derived based on the symmetry of the sine wave using the remaining two bits of the 16-bit counter, where one of the remaining bits can represent a positive or negative value of the reconstructed sine wave and the second of the remaining bits can represent whether the absolute value of the of the sine waveform is increasing or decreasing.

Note that various components of FIGS. 4*a*-4*b* can be implemented digitally instead of in analog circuitry inside an ASIC. Having components implemented digitally instead of in analog circuitry inside the ASIC can save a significant amount of die space and further reduce power consumption.

Figure 5A:
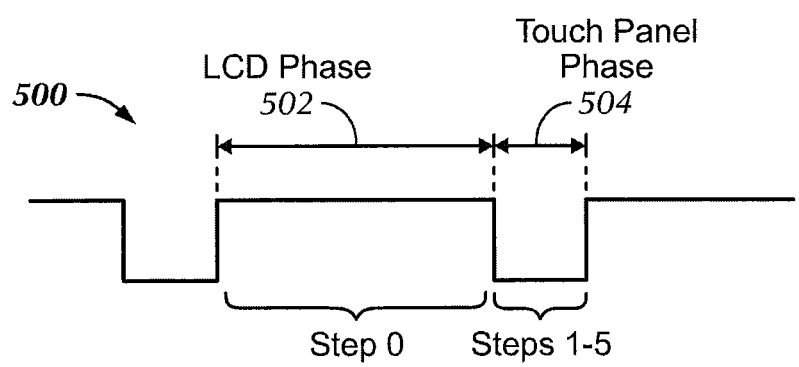
FIG. 5a illustrates an exemplary timing diagram showing an LCD phase and touch sensor panel phase according to various embodiments of this invention.

FIG. 5*a* illustrates exemplary timing diagram 500 showing LCD phase 502 and the vertical blanking or touch sensor panel phase 504 according to various embodiments. During LCD phase 502, the LCD can be actively switching and can be generating voltages needed to generate images. No panel scanning need be performed at this time. During touch sensor panel phase 504, the receive circuit 500 can be configured as a spectrum analyzer to identify low noise frequencies, and can also be configured as touch panel detection logic to detect and locate an image of touch.

It should be noted that the touch sensor phase 504 need not be limited to being performed before or after the LCD phase 502. For example, in one embodiment, the touch sensor phase is performed during the LCD phase. By performing the touch sensor phase 504 during the LCD phase 502, a spectrum analysis can take into account any noise generated during the LCD phase 502. Moreover, in one embodiment, there is no timing association between the LCD phase 502 and the touch sensor 504. In other words, the sensor phase 504 need not be synchronized with LCD phase 502.

Figure 5B:
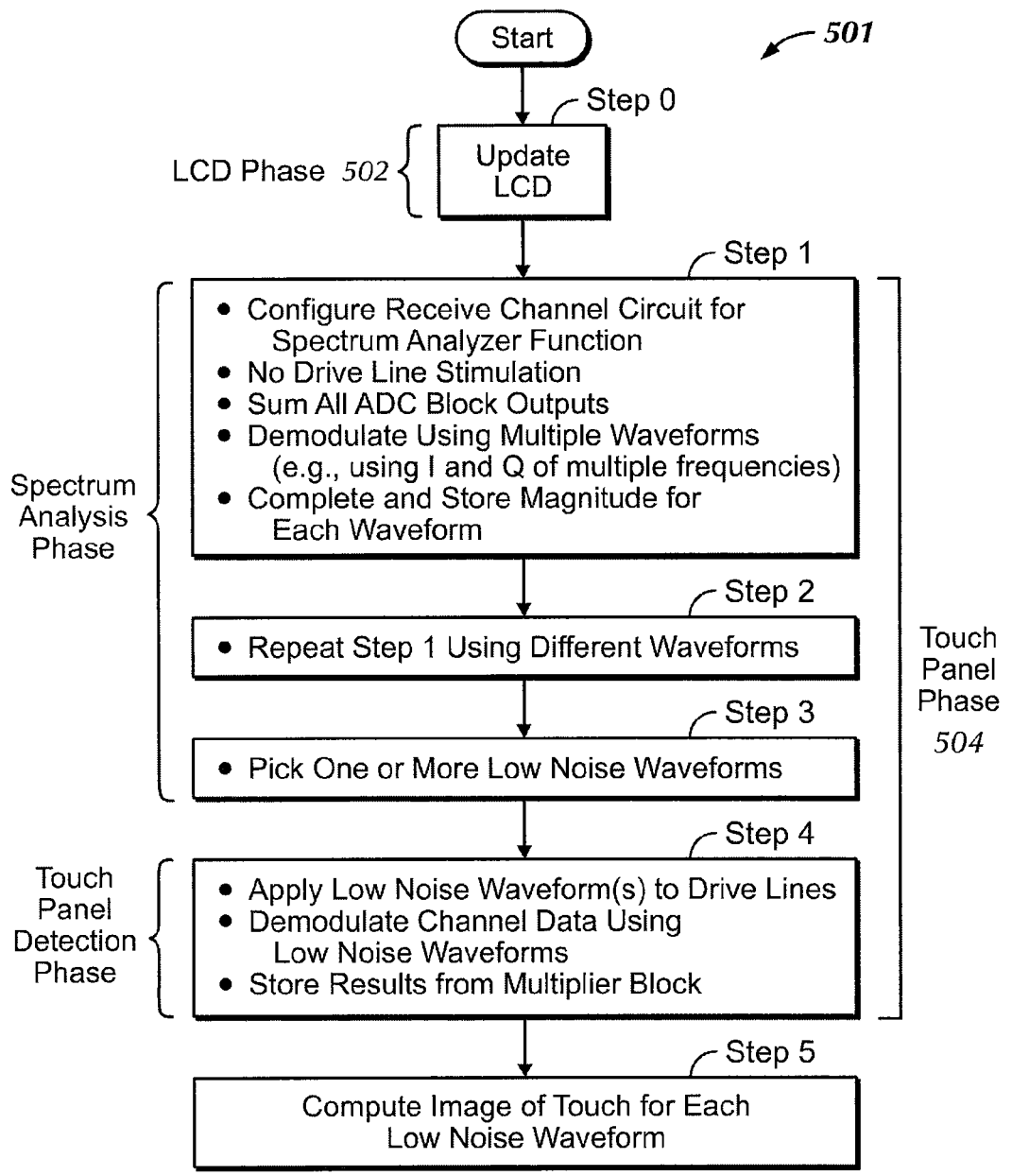
FIG. 5b illustrates an exemplary flow diagram describing an LCD phase and the touch sensor panel phase in accordance with various embodiments of this invention.

FIG. 5*b* illustrates exemplary flow diagram describing process 501 performing LCD phase 502 and touch sensor panel phase 504 according to various embodiments. In Step 0, the LCD can be updated as described above. The various tasks performed in connection with process 501 may be performed by hardware, software, firmware, or any combination thereof. It should be appreciated that process 501 may include any number of additional or alternative tasks. The tasks shown in FIG. 5*b* need not be performed in the illustrated order and process 501 may be incorporated into a more comprehensive procedure or process having additional functionality not described in detail herein. For illustrative purposes, the following description of process 501 may refer to elements mentioned above in connection with FIGS. 1-4.

Steps 1-3 can represent a low noise frequency identification phase 506. In Step 1, receive channel circuit 400 can be configured as a spectrum analyzer. The purpose of the spectrum analyzer is to identify several low noise frequencies for subsequent use in a panel scan. With no stimulation frequencies applied to any of the drive lines of the touch sensor panel, the sum of the output of all ADC blocks 402, which represent the total charge being applied to the touch sensor panel including all detected noise, can be windowed and fed into Multiplier block 414. Multiplier block 414 can demodulate the sum of all ADC channel output using the in-phase (I) and quadrature (Q) signals of select frequencies. The demodulated outputs can be used to calculate the magnitude of the noise at that particular frequency, wherein the lower the magnitude, the lower the noise at that frequency.

In Step 2, the process of Step 1 can be repeated for a different set of frequencies. In accordance with various embodiments, Step 2 need not be performed if the number of frequencies used in Step 1 is sufficient for the desired application. Furthermore, in accordance with other embodiments, Step 1 can be performed more than two times, each time with different sets of frequencies.

In Step 3, one or more low noise frequencies can be selected for use in a subsequent touch sensor panel scan by identifying those frequencies producing the lowest calculated magnitude value.

Step 4 can represent a panel scan phase 508. In Step 4, the receive channel circuit 400 can be configured as panel scan logic. At Step 4, various phases of the one or more selected low noise frequencies can be used to simultaneously stimulate the drive lines of the touch sensor panel, and the Multiplier block 414 can be configured to demodulate the signals received from each sense line using the selected low noise frequencies. The demodulated signals from the multiplier block 414 can then be saved.

In Step 5, after all steps have been completed, the saved results can be used in calculations to determine an image of touch for the touch sensor panel at each of the selected low noise frequencies.

Referring again to the example as shown in FIG. 4*a*, while receive channel circuit 400 is configured as a spectrum analyzer, no stimulation signal need be applied to any of the drive lines in the touch sensor panel. In the present example, there can be 10 channels and therefore 10 ADC blocks 402, one mixer for every two channels in Multiplier block 414 (i.e. 5 mixers), and one mixer 426 used to mix a window function, for a total of 6 mixers. The outputs of all ADC blocks 402 in receive channel circuit 400 can be summed together using summing circuit 428, and fed into Multiplier block 414 through multiplexer or switch 424, which can be configured to select the output of summing circuit 428 instead of NCO 420.

While receive channel circuit 400 is configured as a spectrum analyzer, the background coupling onto the sense lines can be measured. Because no Vstim is applied to any drive line, there is no Csig at any pixel, and any touches on the panel should not affect the noise result (unless the touching finger or other object couples noise onto ground). By adding all outputs of all ADC blocks 402 together in summing circuit 428, one digital bitstream can be obtained representing the total noise being received into the touch sensor panel. The frequencies of the noise and the pixels at which the noise is being generated are not known prior to spectrum analysis, but do become known after spectrum analysis has been completed. The pixel at which the noise is being generated is not known and is not recovered after spectrum analysis, but because the bitstream is being used as a general noise collector, they need not be known.

While configured as a spectrum analyzer, the mixers in Multiplier block 414, in the present example of FIG. 4*a*, can be used to demodulate I and Q signals for different frequencies as generated by NCO 420. These frequencies can be between 200 kHz and 300 kHz, for example. NCO 420 can produce a digital rampsine wave that can be used by the digital mixers in Multiplier block 414 to demodulate a windowed noise output of summing circuit 428.

The output of summing circuit 428 (the noise signal) can then be demodulated by I and Q components of the frequencies using digital mixers in Multiplier block 414. The result of each mixer can be accumulated in separate accumulators in accumulator block 416. Each accumulator can be a digital register that, over a sample time period, can accumulate (add together) the instantaneous values from the mixers. At the end of the sample time period, the accumulated value can represent an amount of noise signal at that frequency and phase.

The accumulated results of I and Q demodulation at a particular frequency can represent the amount of content at that frequency that is either in phase or in quadrature. These two values can then be used in magnitude and phase calculation circuit (not shown) to find the absolute value of the total magnitude (amplitude) at that frequency. A higher magnitude can mean a higher background noise level at that frequency. The magnitude value computed by each magnitude and phase calculation circuit can be saved. Note that without the Q component, noise that was out of phase with the demodulation frequency can remain undetected.

This entire process can be repeated for different frequencies, if desired. The saved magnitude values for each of the frequencies can then be compared, and one or more frequencies with the lowest magnitude values (and therefore the lowest noise levels), can be chosen.

Still referring to FIG. 4*a*, when receive channel circuit 400 is configured as touch panel detection logic, the dashed lines in FIG. 4*a* can be ignored. At Step 4 in FIG. 5*b*, various phases of the selected low noise frequencies can be used to simultaneously stimulate the drive lines of the touch sensor panel, and the receive channel circuit 400 can be configured to demodulate the signal received from each sense line connected to the receive channel circuit 400 using a selected low noise frequency. The demodulated signals from each digital signal mixer in Multiplier block 414 can then be accumulated in accumulator block 416, and saved.

It can be noted that Step 4 of FIG. 5*b* can combine two features, multi-phase scanning and multi-frequency scanning. Each feature can have its own benefit. In some embodiments, multi-frequency scanning can save time by a factor of three, while multi-phase scanning can provide a better signal-to-noise ratio (SNR) by about a factor of two.

Multi-phase scanning can be employed by simultaneously stimulating most or all of the drive lines using different phases of multiple frequencies. Multi-phase scanning is described in Applicant's co-pending U.S. application Ser. No. 11/619,433 entitled "Simultaneous Sensing Arrangement," filed on Jan. 3, 2007, the contents of which are incorporated by reference herein. One benefit of multi-phase scanning is that more information can be obtained from a single panel scan. Multi-phase scanning can achieve a more accurate result because it minimizes the possibility of inaccuracies that can be produced due to certain alignments of the phases of the stimulation frequency and noise.

In addition, multi-frequency scanning can be employed by simultaneously stimulating most or all of the drive lines using multiple frequencies. As noted above, multi-frequency scanning can save time. For example, in some previous methods, 15 drive lines can be scanned in 15 steps at frequency A, then the 15 drive lines can be scanned in 15 steps at frequency B, then the 15 drive lines can be scanned in 15 steps at frequency C, for a total of 45 steps. However, using multi-frequency scanning, fewer steps can be performed.

At the conclusion of Step 4, when the results have been obtained and stored, additional calculations can be performed utilizing these results. For example, for each channel M, where M=0 to N, computations can be performed to obtain a drive line result for each drive line and each frequency used to stimulate the drive lines. A set of computations for each channel can generate a resultant pixel value for the sense line of pixels associated with that channel. For example, a Drive Line 0, frequency A computation (xa1[chM]+xa2[chM]+xa3[chM]+xa4[chM])/4 can generate the Drive Line 0, channel M result for frequency A. Computation can be performed and stored for every channel. These computations correspond to Step 5 of FIG. 5b.

The results for a particular frequency can represent an image map or image of touch at that frequency because a unique value is provided for each sense line (i.e. channel) and drive line intersection. These touch images can then be processed by software that synthesizes the three images and looks at their characteristics to determine which frequencies are inherently noisy and which frequencies are inherently clean. Further processing can then be performed. For example, if three frequencies are used to stimulate the drive lines and all three are relatively noise-free, the results of each three frequencies can be averaged together.

Figure 6A:
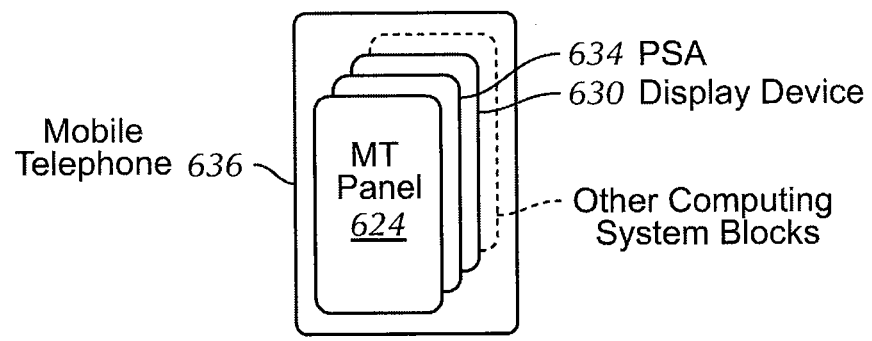
FIG. 6a illustrates an exemplary mobile telephone that can utilize a receive channel circuit to perform both spectrum analysis functions and touch panel scan functions according to various embodiments of this invention.

FIG. 6a illustrates an exemplary mobile telephone 636 that can include touch sensor panel 624, display device 630 bonded to the sensor panel using pressure sensitive adhesive (PSA) 634, and other computing system blocks in computing system 100 of FIG. 1 for applying multiple stimulation frequencies and phases to the touch sensor panel to identify low noise stimulation frequencies and detect and localize touch events using receive channel circuit 400 according to various embodiments of the invention.

Figure 6B:
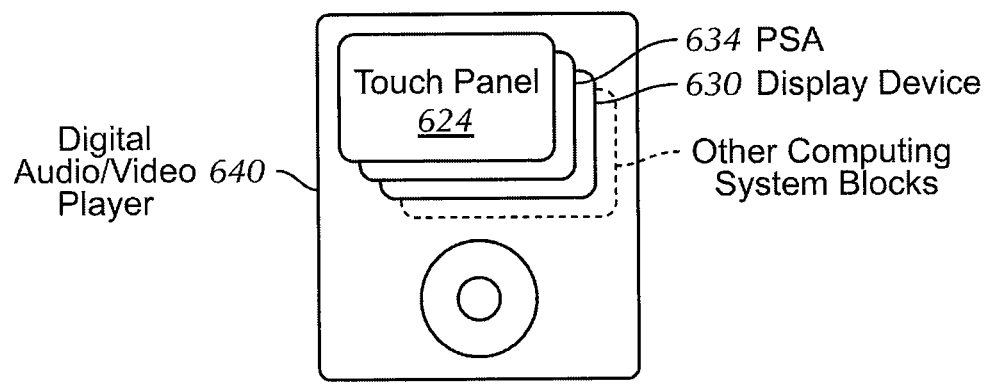
FIG. 6b illustrates an exemplary digital audio player that can utilize a receive channel circuit to perform both spectrum analysis functions and touch panel scan functions according to various embodiments of this invention.

FIG. 6b illustrates an exemplary digital audio/video player 640 that can include touch sensor panel 624, display device 630 bonded to the sensor panel using pressure sensitive adhesive (PSA) 634, and other computing system blocks in computing system 100 of FIG. 1 for applying multiple stimulation frequencies and phases to the touch sensor panel to identify low noise stimulation frequencies and detect and localize touch events using receive channel circuit 400 according to various embodiments of the invention.

Note that one or more of the functions described herein can be performed by firmware stored in memory (e.g. one of the peripherals 104 in FIG. 1) and executed by panel processor 102, or stored in program storage 132 and executed by host processor 128. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method of scanning a touch sensor panel, comprising:
demodulating a first plurality of signals received from a plurality of sense lines in a single scan of the touch sensor panel with a demodulation frequency using a plurality of mixers;
wherein the plurality of mixers demodulate different ones of the first plurality of signals received in the single scan at different times using the demodulation frequency; and
wherein a number of the plurality of mixers is less than a number of the first plurality of signals.

2. The method of claim 1, further comprising:
demodulating a summation of a second plurality of signals received from the plurality of sense lines of the touch sensor panel with a plurality of sample frequency signals using the plurality of mixers.

3. The method of claim 2, further comprising generating the plurality of sample frequency signals and the demodulation frequency using a single numerically controlled oscillator (NCO).

4. The method of claim 2, further comprising selecting one of the plurality of sample frequency signals as a low noise signal.

5. The method of claim 4, wherein the demodulation frequency has the same frequency as the selected low noise signal.

6. The method of claim 4, further comprising applying a stimulation signal to each of a plurality of drive lines of the touch sensor panel, the stimulation signal having the same frequency as the selected low noise signal.

7. The method of claim 2, wherein at least some of the plurality of sample frequency signals have different frequencies.

8. The method of claim 2, wherein the demodulation of the summation of the second plurality of signals with the plurality of sample frequency signals comprises:

demodulating the summation of the second plurality of signals with a first set of the plurality of sample frequency signals using the plurality of mixers during a first time period; and demodulating the summation of the second plurality of signals with a second set of the plurality of sample frequency signals using the plurality of mixers during a second time period that is different from the first time period, wherein a number of the plurality of mixers is equal to a number of sample frequency signals in each set of the plurality of sample frequency signals.

9. The method of claim 1, further comprising storing the first plurality of signals and outputting the different ones of the first plurality of signals for demodulation at the different times.

10. The method of claim 1, further comprising accumulating the demodulated first plurality of signals to generate a plurality of values representative of the accumulated demodulated signals for each sense line.

11. The method of claim 1, wherein the demodulation of the first plurality of signals comprises:

demodulating a first set of the first plurality of signals using the plurality of mixers during a first time period; and demodulating a second set of the first plurality of signals using the plurality of mixers during a second time period that is different from the first time period, wherein a number of the plurality of mixers is equal to a number of the first plurality of signals in each set of the first plurality of signals.

12. An apparatus for obtaining a plurality of values used to generate an image of touch from a touch sensor panel, comprising:

a plurality of analog-to-digital converters (ADCs), each ADC configured to receive an analog signal from a different sense line of the touch sensor panel and convert the signal into a digital signal;

a waveform generator circuit operable to generate a plurality of signals having different waveforms; and a plurality of mixers, wherein, during a first phase, the plurality of mixers are configured to mix different ones of the signals outputted from the plurality of ADCs in a single scan of the touch sensor panel at different times with at least one signal generated by the waveform generator circuit; and wherein a number of signals received from the plurality of ADCs is equal to N, a number of the plurality of signals having different waveforms is equal to N, and a number of the plurality of mixers is less than N.

13. The apparatus of claim 12, further comprising:

a summation circuit couplable to the plurality of ADCs and operable to generate a sum representative of a summation of the digital signals from the plurality of ADCs; and wherein during a second phase, the plurality of mixers are configured to mix each of a plurality of signals having different waveforms generated by the waveform generator with the sum.

14. The apparatus of claim 13, further comprising:

an amplitude window generator circuit; and a further mixer operable to mix an output of the amplitude window generator with an input signal to generate a windowed representation of the signal, wherein, during the second phase, the input signal is the signal representative of the summation of the ADC outputs, and, during the first phase, the input signal is the at least one signal generated by the waveform generator circuit.

15. The apparatus of claim 12, further comprising a multiplexer configured to output a first set of the plurality of signals having different waveforms to the plurality of mixers at a first time, and output a second set of the plurality of signals having different waveforms to the plurality of mixers at a second time that is different from the first time.

16. The apparatus of claim 15, wherein the first time corresponds to a first edge of a control clock signal and the second time corresponds to a second edge of a control clock signal.

17. The apparatus of claim 15, wherein the first set comprises half of the plurality of signals having different waveforms and the second set comprises the remaining half of the plurality of signals having different waveforms.

18. The apparatus of claim 15, wherein the plurality of signals having different waveforms comprise signals having different frequencies and phases.

19. The apparatus of claim 15, further comprising a multiplexer configured to output a first set of the plurality of signals outputted from the ADCs to the plurality of mixers at a third time, and output a second set of the plurality of signals outputted from the ADCs to the plurality of mixers at a fourth time that is different from the third time.

20. The apparatus of claim 12, further comprising an accumulator coupled to each of the plurality of mixers for generating a value representing an accumulated mixer output.

21. The apparatus of claim 12, wherein the waveform generator circuit comprises a numerically controlled oscillator (NCO).

22. A computing system comprising the apparatus of claim 12.

23. A mobile telephone comprising the computing system of claim 22.

24. A digital audio player comprising the computing system of claim 22.

* * * * *